United States Patent [19]
Saito

[11] Patent Number: 5,484,223
[45] Date of Patent: Jan. 16, 1996

[54] DOUBLE TERMINAL STOP CONNECTOR

[75] Inventor: Hitoshi Saito, Shizuoka, Japan

[73] Assignee: Yazaki Corporation, Japan

[21] Appl. No.: 184,444

[22] Filed: Jan. 21, 1994

[30] Foreign Application Priority Data

Jan. 22, 1993 [JP] Japan ................................ 5-001303 U

[51] Int. Cl.$^6$ ............................ F16B 1/00; H01R 13/436
[52] U.S. Cl. .......................... 403/329; 403/319; 403/326; 403/315; 403/13; 439/752
[58] Field of Search ............................ 439/752; 403/319, 403/316, 315, 329, 326, 13, 14

[56] References Cited

U.S. PATENT DOCUMENTS

| | | |
|---|---|---|
| 4,921,448 | 5/1990 | Endo et al. . |
| 5,059,142 | 10/1991 | Ohta et al. ................................ 439/752 |
| 5,141,452 | 8/1992 | Yoneda et al. . |
| 5,346,414 | 9/1994 | Sakai et al. ................................ 439/752 |
| 5,350,320 | 9/1994 | Hashizawa et al. ...................... 439/752 |

FOREIGN PATENT DOCUMENTS

| | | |
|---|---|---|
| 4-12270 | 1/1992 | Japan . |
| 4-30793 | 7/1992 | Japan . |
| 5-217621 | 8/1993 | Japan ..................................... 439/752 |
| 2237457 | 1/1991 | United Kingdom .................... 439/752 |

*Primary Examiner*—Blair M. Johnson
*Assistant Examiner*—Anthony Knight
*Attorney, Agent, or Firm*—Wigman, Cohen, Leitner & Myers

[57] ABSTRACT

A double terminal stop connector (1) has a terminal stop frame (4) and a connector housing (2). The terminal stop frame (4) has two opposing walls (8) and a pair of flexible hinge members (7) interposed therebetween on both sides of the terminal stop frame so that the two opposing walls can be elastically compressed. A temporary engagement arm 10 is formed with an end stopper surface (8c) and a temporary engagement projection (9). At least one complete engagement projection (11) is formed on at least one surface of the two opposing walls of the terminal stop frame. The connector housing (2) is formed with a temporary engagement slot (16) which is engageable with the temporal engagement arm projection (9) when the terminal stop frame is temporarily engaged with the connector housing. At least one complete engagement hole (17) is engageable with the at least one complete engagement projection (11) when the terminal stop frame is completely engaged with the connector housing. The end stopper surface (8c) of the temporary engagement arm (10) is brought into contact with an end surface of the connector housing under temporary engagement conditions but is dislocated from the end surface of the connector housing when the flexible members are compressed for complete engagement of the terminal stop frame with the connector housing. Therefore, it is possible to prevent the terminal stop frame (4), when engaged with the connector housing temporarily, from being unintentionally engaged with the connector housing completely.

8 Claims, 4 Drawing Sheets

DOUBLE TERMINAL STOP CONNECTOR

BACKGROUND OF THE INVENTION

1. Field of the Invention

The present invention relates to a double terminal stop connector, and more specifically to a double terminal stop connector which can prevent a terminal stop frame from being pushed into a connector housing inadvertently from a first, temporary engagement position to a complete, or second engagement position between the terminal stop frame and the connector housing.

2. Description of the Related Art

An example of a double terminal stop connector is disclosed in Japanese Published Examined Utility Model Application No. 4-30793, for instance. The conventional double terminal stop connector is composed of a resin connector housing and a resin terminal stop frame engaged with the connector housing. A plurality of female terminals are inserted into the connector housing so as to be mated with a plurality of male terminals arranged within the connector housing, after having been passed through the terminal stop frame. When the terminal stop frame is temporarily engaged with the connector housing, the mated female terminals inserted into the connector housing are stopped by a plurality of lance pieces formed integral with the connector housing. In addition, when the terminal stop frame is further pushed toward the connector housing so as to be engaged with the connector housing completely, the mated female terminals are further stopped by the end surface of the terminal stop frame. In the conventional double terminal stop connector, the connector housing is formed with two opposing frame engaging pieces on two opposing side walls of the connector housing, respectively. The terminal stop frame is formed with two temporary engagement projections and two complete engagement projections on two opposing outer side walls of the terminal stop frame, respectively, in such a way as to be arranged in the engagement direction of the two. Both of these temporary and complete engagement projections are to be engaged with the same two frame engaging pieces of the connector housing provided on the two opposing outer side walls of the connector housing, respectively. Therefore, when the terminal stop frame is engaged with the connector housing temporarily, the two temporary engagement projections are first engaged with the two opposing frame engaging pieces respectively, and when the terminal stop frame is further pushed toward the connector housing, the two complete engagement projections are further engaged with the same two opposing engagement frame pieces, respectively so as to provide the double terminal stop engagement.

In the above-mentioned conventional double terminal stop connector, however, there exists a problem in that when the terminal stop frame is inadvertently pushed toward the connector housing under the condition that the terminal stop frame is temporarily engaged with the connector housing, the terminal stop frame is completely engaged with the connector housing, so that the terminals are stopped double by the connector housing and the terminal stop frame. Further, since the temporary and complete engagement projections are formed relatively small or low so that the terminal stop frame can be engaged easily with the connector housing, there exists another problem in that the terminal stop frame is easily disengaged from the connector housing, with the result that it is rather difficult to adjust the temporary engagement force and the complete engagement force under a well balanced condition.

SUMMARY OF THE INVENTION

With these problems in mind, therefore, it is the object of the present invention to provide a double terminal stop connector which can prevent the terminal stop Frame from being pushed into the connector housing inadvertently (into the complete engagement) under the temporary engagement condition and in addition the terminal stop frame can be engaged with the connector housing easily and further securely.

To achieve the above-mentioned object, the present invention provides a double terminal stop connector (1) comprising: a terminal stop frame (4) having: a pair of flexible members (7) interposed between two opposing walls (8) of said terminal stop frame and on both sides of said terminal stop frame so that the two opposing walls can be elastically compressed; a temporary engagement arm (10) formed with an end stopper surface (8c) and a temporary engagement projection (9), the temporary engagement arm extending from one of the two opposing walls of said terminal stop frame; and at least one complete engagement projection (11) formed on at least one surface of the two opposing walls of said terminal stop frame; and a connector housing (2) formed with: a temporary engagement slot (16) engageable with the temporary engagement arm projection (9) when said terminal stop frame is temporarily engaged with said connector housing; and at least one complete engagement hole (17) engageable with the at least one complete engagement projection (11) when said terminal stop frame is compressed and thereby completely engaged with said connector housing; and the end stopper surface (8c) of the temporal engage arm (10) is brought into contact with an end surface of said connector housing under temporary engagement conditions but dislocated from the end surface of said connector housing when the flexible members are compressed for complete engagement of said terminal stop frame with said connector housing.

Further, the terminal stop frame (4) is further formed with a pair of side guide plates (13) extending from each of the two opposing walls in engagement direction between said terminal stop frame and said connector housing. Further, the terminal stop frame (4) has two complete engagement projections (11) and said connector housing (2) is formed with two complete engagement holes (17). Further, the connector housing is further formed with a pair of side slots (14) on both sides thereof, into which the flexible members (7) of said terminal stop frame can be inserted when said terminal stop frame is engaged with said connector housing.

In the terminal stop connector according to the present invention, since the end stopper surface (8c) of the temporary engagement arm (10) can be brought into contact with an end surface (3a) of the connector housing under temporary engagement conditions, it is possible to prevent the terminal stop frame from being engaged completely with the connector housing inadvertently. However, since the end stopper surface (8c) of the temporary engagement arm (10) can be dislocated from the end surface of the connector housing when the flexible members are compressed by the fingers, it is possible to engage the terminal stop frame completely with the connector housing easily. Further, since the terminal stop frame can be engaged with the connector housing by the restoring forces of the flexible members, it is possible to securely engage the terminal stop frame with the connector housing.

DETAILED DESCRIPTION OF THE PREFERRED EMBODIMENTS

Figure 1:
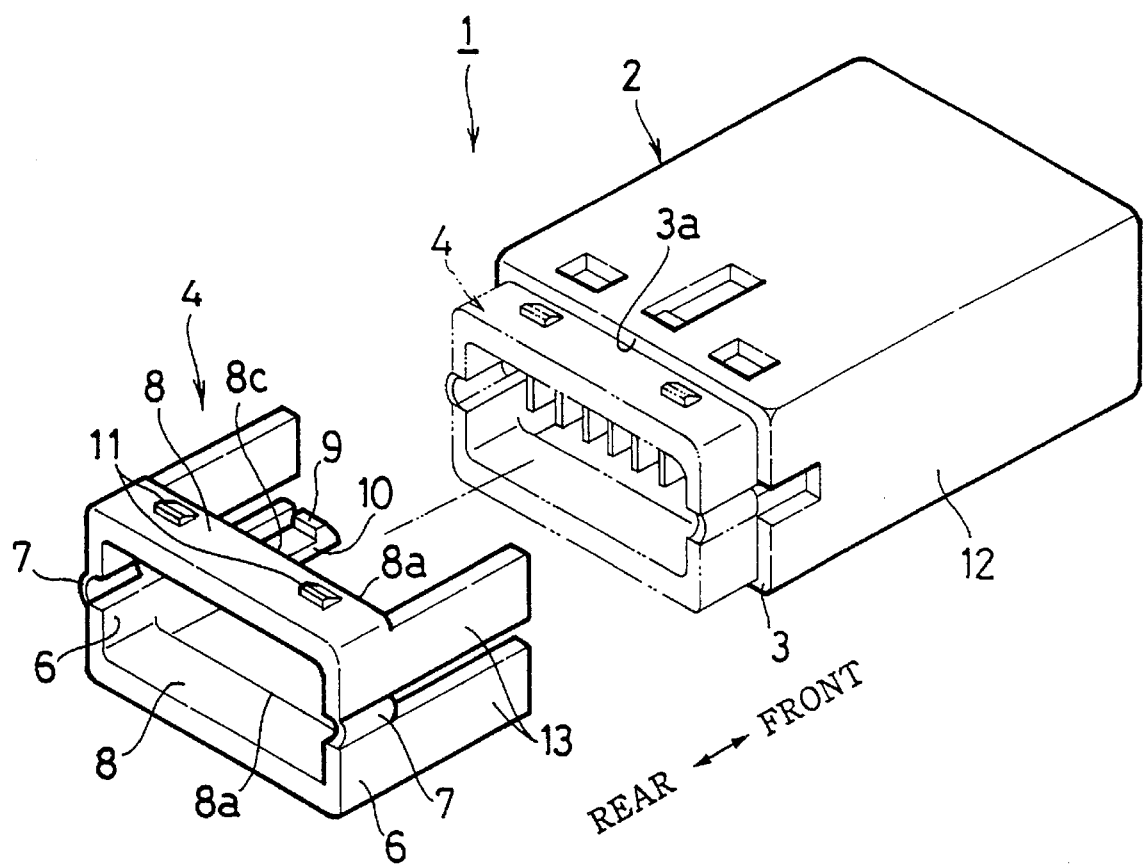
FIG. 1 is a perspective exploded view showing an embodiment of the double terminal stop connector according to the present invention.

An embodiment of the double terminal stop connector according to the present invention will be described hereinbelow with reference to the attached drawings.

The double terminal stop connector 1 is composed of a resin connector housing 2 and a separate resin terminal stop frame 4 engageable with the connector housing 2. The terminal stop frame 4 is engaged with the connector housing 2 from a rear (left side in FIG. 1) opening portion 3 of the connector housing 2. A plurality of female terminals 26 (see FIGS. 4 to 6) are mated with a plurality of male terminals arranged within the connector housing 2 after having been passed through the terminal stop frame 4. When the terminal stop frame 4 is temporarily engaged with the connector housing 2 at a first position, the mated female terminals 26 are stopped by a plurality of lance pieces 18 (see FIG. 6) formed integral with the connector housing 2. In addition, when the terminal stop frame 4 is further pushed toward the connector housing 2 so as to be engaged with the connector housing 2 completely in the second position, the rear portions 31 (see FIG. 6) of the mated female terminals 26 are further stopped by the terminal stop frame 4.

As depicted in FIG. 1, the terminal stop frame 4 is composed of two opposing upper and lower frame wall portions 8 and two opposing side members 7, which are thin and flexible, and are connected between the two opposing upper and lower frame wall portions 8 on both side walls 6 thereof so as to form the terminal stop frame 4. Each of the flexible side members 7 is deformable outward, as shown in FIG. 1. Therefore, when the two opposing frame wall portions 8 are pinched by the fingers, the two flexible members 7 can be elastically deformed, and the terminal stop frame 4 is compressed in the vertical direction as seen in FIG. 1. Each of the upper and lower frame wall portions 8 is formed with a pair of engagement guide plates 13 extending toward the connector housing 2 in the engagement direction. Further, the front ends 8a of two opposing upper and lower frame wall portions 8 of the terminal stop frame 5 are exposed so as to be brought into contact with the rear end surface 3 of the connector housing 2.

Figure 4:
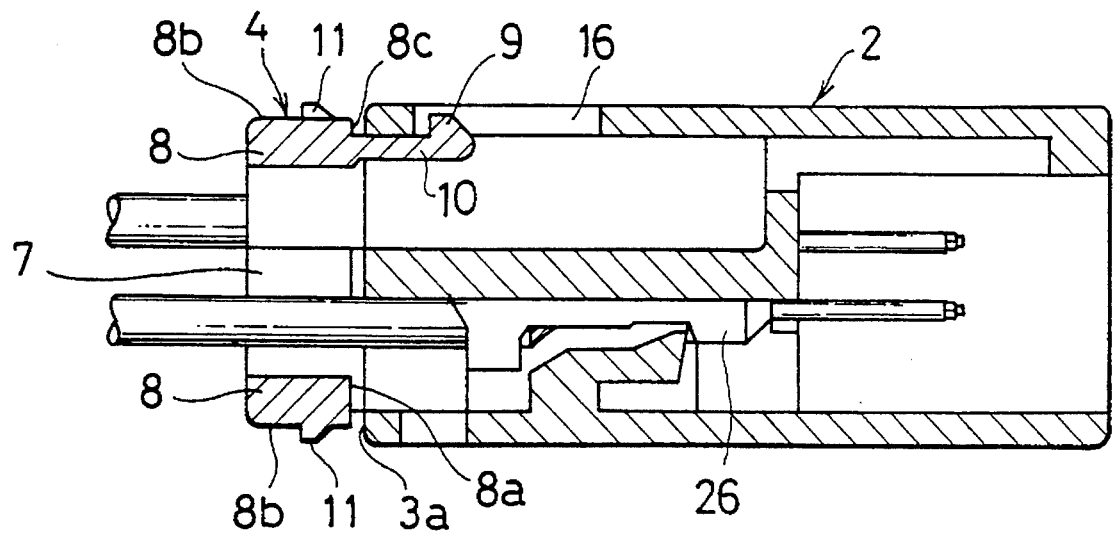
FIG. 4 is a longitudinal cross-sectional view showing the temporary engagement state in which the terminal stop frame is engaged temporarily at a first position with the connector housing of the double terminal stop connector shown in FIG. 1.

As depicted in FIG. 4, a temporary engagement arm 10 having a temporary engagement projection 9 is formed integral with the upper frame wall portion 8 at the middle portion thereof. A stepwise portion 8c is projectingly formed between an upper surface portion 8b of the upper frame wall portion 8 and the temporal engage projection 9 as a temporary engagement stopper. Further, a pair of right and left complete engagement projections 11 are formed on each of the upper and lower end surfaces 8b of the upper and lower frame wall portions 8, as shown in FIGS. 1 and 2.

Figure 2:
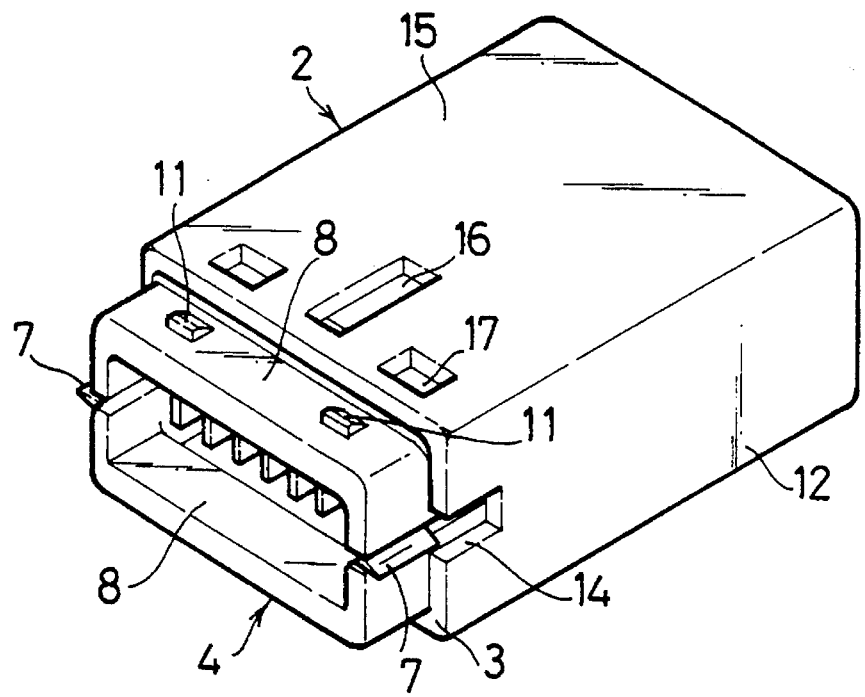
FIG. 2 is a perspective view showing a temporary engagement state in which a terminal stop frame is engaged temporarily at a first position with a connector housing of the double terminal stop connector shown in FIG. 1.
Figure 3:
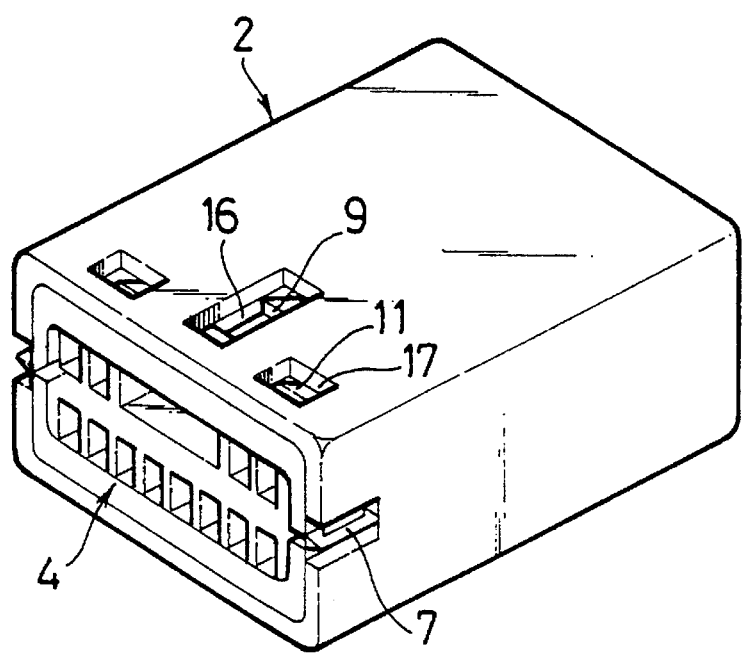
FIG. 3 is a perspective view showing a complete engagement state in which the terminal stop frame is engaged completely at a second position with the connector housing of the double terminal stop connector shown in FIG. 1.

On the other hand, as depicted in FIG. 2, the connector housing 2 is formed with two side slots 14 extending from the rear opening 3 of the connector housing 2 in the engagement direction so that the two flexible members 7 can be accommodated when the terminal stop frame 4 is engaged with connector housing 2 completely as shown in FIG. 3. In addition, the connector housing 2 is formed with an engagement slot 16 engageable with the temporal engagement projection 9 of the terminal stop frame 4 on the upper wall portion 15 of the connector housing 2 and two complete engagement holes 17 engageable with the complete engagement projections 11 on both the upper and lower wall portions 15 of the connector housing 2.

The engagement of the terminal stop frame 4 with the connector housing 2 will be described hereinbelow. When the terminal stop frame 4 is temporarily engaged with the connector housing 2 at the first position, the temporary engagement projection 9 of the temporary engagement arm 10 is engaged with the engagement slot 16 of the connector housing 2. Under these conditions, since the end surfaces 8a and 8c of the upper and lower frame wall portions 8 of the terminal stop frame 4 are brought into contact with the end surface 3a of the rear end opening 3 of the connector housing 2, even if the terminal stop frame 4 is pushed toward the connector housing 2 inadvertently, it is possible to prevent the terminal stop frame 4 complete engagement second position.

Figure 5:
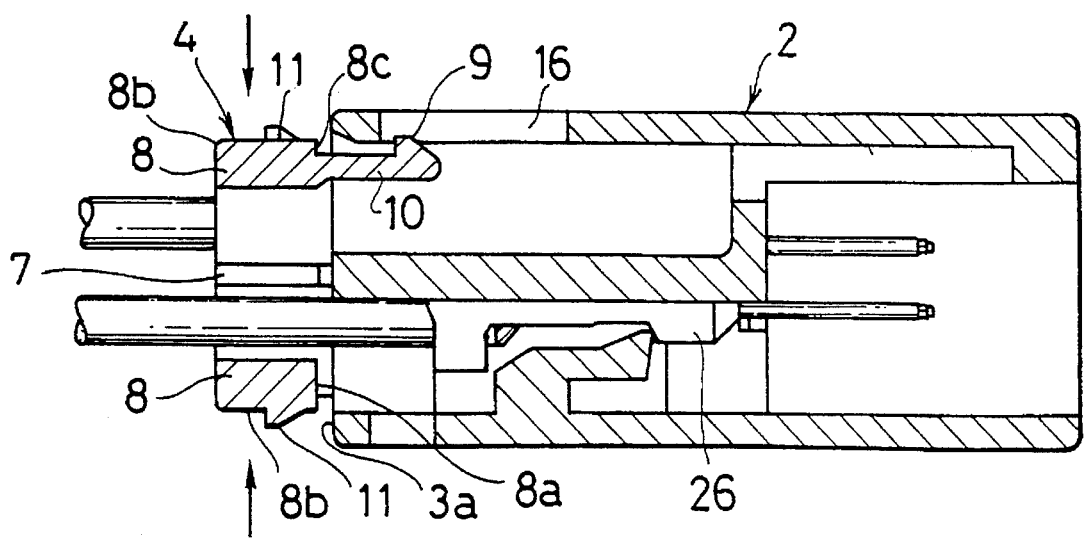
FIG. 5 is a longitudinal cross-sectional view showing the first position temporary engagement state in which flexible members of the terminal stop frame are compressed for easy complete engagement with the connector housing.

Further, when the terminal stop frame 4 is required to be completely engaged with the connector housing 2 in the second position the two opposing upper and lower frame wall portions 8 of the terminal stop frame 4 are pinched between the two fingers to deform the two side flexible members 7. In this case, since the terminal stop frame 4 can be compressed in the vertical direction as shown in FIG. 5, it is possible to easily engage the terminal stop frame 4 with the connector housing 2 until the complete engagement projections 11 are engaged with the complete engagement holes 17 formed in the connector housing 2. In this case, since the complete engagement projections 11 engaged with the complete engagement holes 17 can be brought into tight contact with the connector housing 2 by the restoring forces of the flexible members 7, it is possible to realize a reliable engagement between the terminal stop frame 4 and the connector housing 2.

Figure 6:
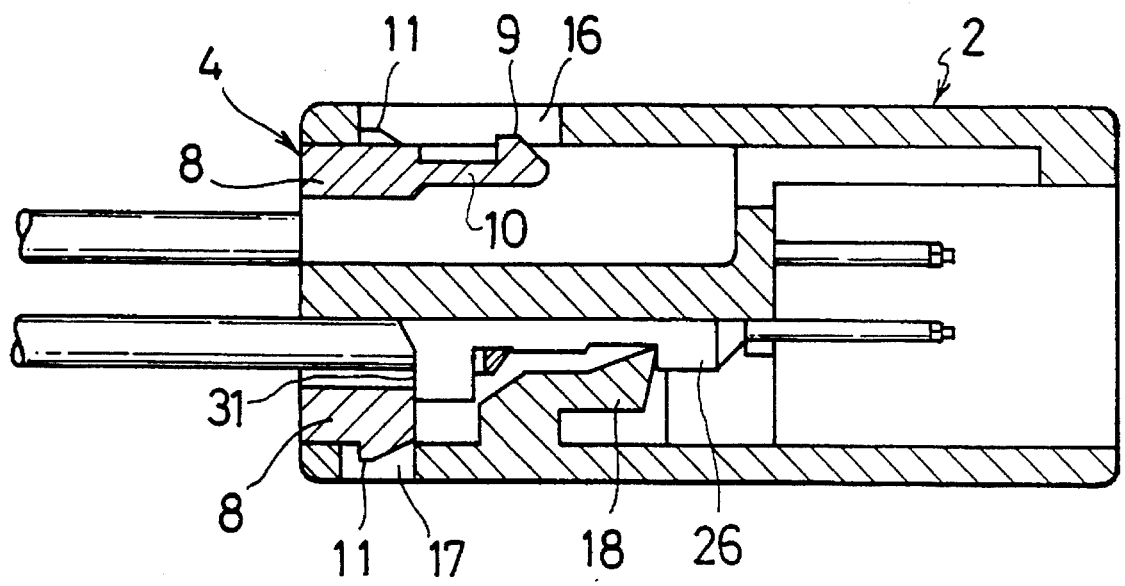
FIG. 6 is a longitudinal cross-sectional view showing a second position complete engagement state in which the terminal stop frame is engaged completely with the connector housing of the double terminal stop connector shown in FIG. 1.

Under these conditions, since the front end surface of the lower frame wall portion 8 of the terminal stop frame 4 is brought into contact with the rear portions 31 of the female terminals 26 as shown in FIG. 6, the female terminals 26 are stopped double by a lance portion 18 of the connector housing 2 and the terminal stop frame 4 together.

As described above, in the double terminal stop connector according to the present invention, since the terminal stop frame 4 can be engaged with the connector housing 2 only when the two flexible members 7 are deformed by the fingers to compress the terminal stop frame 4 in the direction perpendicular to the engagement direction of the two, it is possible to prevent the terminal stop frame 4 from being pushed into the connector housing 2 inadvertently from the temporary first engagement position to the complete engagement second position. Therefore, it is possible to improve the productivity owing to a secure assembling work of the double terminal stop connector. In addition, since the terminal stop frame 4 can be compressed for complete engagement with the connector housing 2, it is possible to facilitate the engagement work of the double terminal stop connector. Further, since the terminal stop frame 4 can be engaged with the connector housing 2 by the restoring force of the flexible elements 7, it is possible to improve the reliability of the engagement condition between both.

What is claimed is:

1. A double terminal stop connector comprising:
    a terminal stop frame having an axis, a first pair of opposing frame walls, and a pair of end walls joined with the frame walls:
        a pair of flexible hinge members aligned with the axis and interposed between upper and lower portions of each of the end walls so that the two opposing frame walls can be elastically compressed at the hinges;
        a temporary engagement arm having an end stopper surface integrally formed thereon and a temporary engagement projection, the temporary engagement arm extending from one of the two opposing frame walls of the terminal stop frame; and
        at least one complete engagement projection formed on at least one outer surface of each of the two opposing frame walls of the terminal stop frame; and
    a connector housing adapted to receive the terminal stop frame and having formed therewith:
        a temporary engagement slot engageable with the temporary engagement arm projection when the terminal stop frame is temporarily engaged with the connector housing at a temporary engagement first position; and
        at least one complete engagement hole engageable with the at least one complete engagement projection when the terminal stop frame is compressed and thereby completely engaged with the connector housing at a complete engagement second position;
    wherein the end stopper surface is brought into contact with an end surface of the connector housing at the first temporary engagement position and displaced from the end surface of the connector housing, and wherein the flexible hinge members are compressed for insertion to the second position where complete engagement of the terminal stop frame joined with the connector housing is achieved.

2. The double terminal stop connector of claim 1, wherein the terminal stop frame is further formed with a pair of side guide plates extending from each of the two opposing walls in an engagement direction between the terminal stop frame and the connector housing.

3. The double terminal stop connector of claim 1, wherein the terminal stop frame has two complete engagement projections and the connector housing is formed with two complete engagement holes mateable with the complete engagement projections.

4. The double terminal stop connector of claim 1, wherein the connector housing further includes a pair of side slots on opposing sides therein, each of said slots being adapted to receive a respective one of the flexible hinge members when the terminal stop frame is completely engaged with the connector housing.

5. A double terminal stop connector comprising:
    a terminal stop frame having an axis, a first pair of opposing frame walls spaced to a first dimension, and a pair of end walls joined with the frame walls:
        a pair of flexible hinge members aligned with the axis and interposed between upper and lower portions of each of the end walls so that the two opposing frame walls can be elastically compressed at the hinges to a second dimension;
        a temporary engagement arm having an end stopper surface integrally formed thereon and a temporary engagement projection, the temporary engagement arm extending from one of the two opposing frame walls of the terminal stop frame; and
        at least one complete engagement projection formed on at least one outer surface of each of the two opposing frame walls of the terminal stop frame; and
    a connector housing adapted to receive the terminal stop frame through an aperture that is smaller than the first dimension and at least as great as the second dimension, the frame having formed therewith:
        temporary engagement slot engageable with the temporary engagement arm projection when the terminal stop frame is temporarily engaged with the connector housing at a temporary engagement first position; and
        at least one complete engagement hole engageable with the at least one complete engagement projection when the terminal stop frame is compressed to the second dimension and thereby completely engaged with the connector housing at a complete engagement second position;
    wherein the end stopper surface is brought into contact with an end surface of the connector housing at the first temporary engagement position and displaced from the end surface of the connector housing, and wherein the flexible hinge members are compressed to the second dimension for insertion to the second position where complete engagement of the terminal stop frame joined with the connector housing is achieved.

6. The double terminal stop connector of claim 5, wherein the terminal stop frame is further formed with a pair of side guide plates extending from each of the two opposing walls in an engagement direction between the terminal stop frame and the connector housing.

7. The double terminal stop connector of claim 5, wherein the terminal stop frame has two complete engagement projections and the connector housing is formed with two complete engagement holes mateable with the complete engagement projections.

8. The double terminal stop connector of claim 5, wherein the connector housing is further formed with a pair of side slots on opposing sides therein, each of said slots being adapted to receive a respective one of the flexible members when the terminal stop frame is completely engaged with the connector housing.

* * * * *